United States Patent [19]

Holzinger

[11] 4,212,614

[45] Jul. 15, 1980

[54] DISC BRAKE HOLDING DEVICE FOR PIVOTAL ELEMENTS OF EXPANDABLE PLASTICS MOLDS

[75] Inventor: Karl Holzinger, Bad Oeynhausen, Fed. Rep. of Germany

[73] Assignee: Herbert Kanngiesser GmbH & Co., Vlotho, Fed. Rep. of Germany

[21] Appl. No.: 40,372

[22] Filed: May 18, 1979

[30] Foreign Application Priority Data

May 20, 1978 [DE] Fed. Rep. of Germany ....... 2822178

[51] Int. Cl.² .............................................. B29C 1/00
[52] U.S. Cl. ................................ 425/214; 425/451.9; 425/4 R
[58] Field of Search ................. 425/214, 451.6, 451.9, 425/595, 4 R

[56] References Cited

U.S. PATENT DOCUMENTS

| | | | |
|---|---|---|---|
| 3,241,187 | 3/1966 | Nouel | 425/595 X |
| 3,624,672 | 11/1971 | Spivy | 425/595 X |
| 3,761,216 | 9/1973 | Duarte et al. | 425/214 |
| 3,976,416 | 8/1976 | Hehl | 425/451.6 X |
| 3,981,671 | 9/1976 | Edwards | 425/451.9 X |
| 4,015,920 | 4/1977 | Niederst et al. | 425/451.9 |

*Primary Examiner*—J. Howard Flint, Jr.
*Attorney, Agent, or Firm*—Sughrue, Rothwell, Mion, Zinn and Macpeak

[57] ABSTRACT

The clamping plates 17, 18 and mold support 11 of an expandable plastics molding apparatus are all pivotally mounted, and are provided with holding devices in the form of a disc brake 49 cooperable with a brake disc segment 50 to prevent their undesired pivotal movement.

4 Claims, 4 Drawing Figures

DISC BRAKE HOLDING DEVICE FOR PIVOTAL ELEMENTS OF EXPANDABLE PLASTICS MOLDS

BACKGROUND OF THE INVENTION

This invention relates to an apparatus for the production of molded bodies of expandable plastics, particularly polyurethane, in which the parts of a two-piece mold, wherein the molded bodies are expanded, are attached to two clamping plates of a mold holder or support which is pivotable about at least one axis. The clamping plates are arranged one above the other and are pivotable on parallel axes, and special holding devices are provided to prevent the clamping plates and the mold support from swinging back or from undergoing any other undesired movement.

In a known apparatus (U.S. Pat. Nos. 3,981,671 and 4,007,679) a gear segment and spring pawl serve as the special holding device. These elements are formed and mounted in a very special manner, and the device is said to have an extraordinarily high load capacity. But it is a disadvantage of this type of holding devices that during the operation of the apparatus they cause significant noise and do not allow a stepless pivoting and other movement of the clamping plates and the mold support. The noises are particularly unpleasant because in full use of the apparatus they occur every 2 to 3 minutes and reach about 75 to 80 dB(A). The noise annoyance to operating personnel of the apparatus is thus substantial.

SUMMARY OF THE INVENTION

The basic object of the invention is to provide an apparatus of the above-mentioned type wherein the special holding devices thereof cause only relatively low noise levels and allow a stepless pivoting and other movement of the clamping plates and the mold support.

By providing disc brakes as special holding devices, the noise level of the apparatus can be substantially reduced, and this also enables a stepless pivoting and other movement of the clamping plates and the mold support. Further, activating the disc brakes by an intermediate lever system has a favorable effect on the production cost of the apparatus, and only relatively small pressure springs and operating cylinders are necessary.

DETAILED DESCRIPTION OF THE PREFERRED EMBODIMENT

Figure 1:
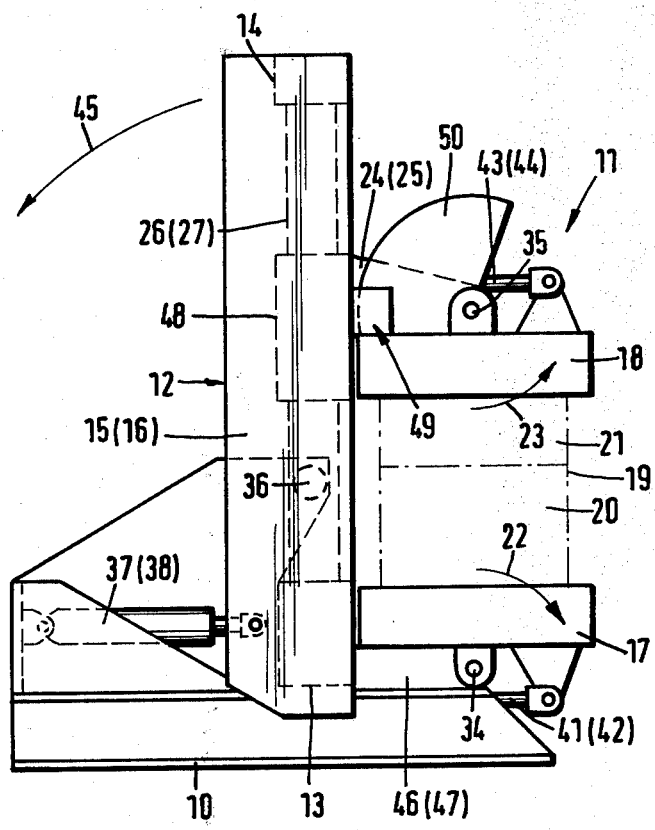
FIG. 1 shows a simplified side view of the apparatus.
Figure 2:
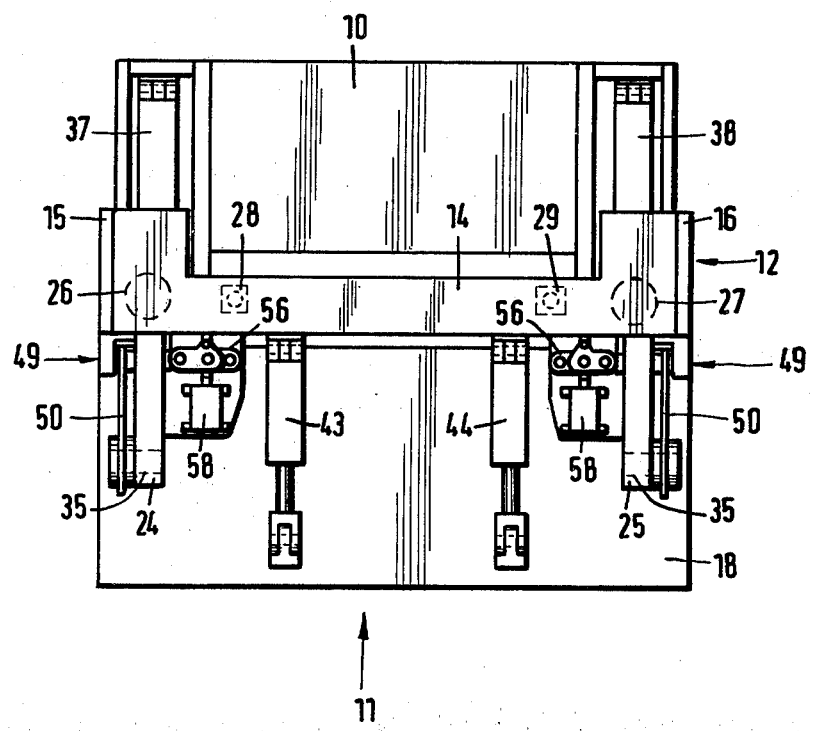
FIG. 2 shows a top view of the apparatus according to FIG. 1 omitting the top holding plates for the lever system of the special holding devices for the top clamping plate.

The apparatus shown in FIGS. 1 and 2 consists of a support stand 10 on which the mold support 11 is pivotably mounted. The mold support basically consists of a rectangular frame 12 and clamping plates 17, 18 for the elements 20, 21 of the mold 19, which are pivotably mounted on the front side of the frame 12. The frame has two vertical elements 15, 16 connected with each by two horizontal elements 13, 14 in the form of a cross yoke.

The upper clamping plate 18 is pivotably mounted on two arms 24, 25, which are adjustably mounted on two vertical guide columns 26, 27. The guide columns are mounted within the frame 12 between the horizontal elements 13, 14 on the left and right hand sides next to the vertical elements 15, 16 and laterally of the clamping plates 17, 18. The upper clamping plate 18 can be pivoted 90° about axis 35 in the direction of arrow 23 and back. The upper clamping plate 18 can thus be brought out of its position parallel to the lower clamping plate 17 into a position perpendicular thereto when the mold support 11 is not pivoted. The height of the upper clamping plate can be adjusted by means of two cylinders 28, 29, one being mounted in the vicinity of the left vertical element of the frame 12 and one in the vicinity of the right vertical element, and laterally of the two clamping plates 17, 18. The cylinders 28, 29 are hinged at one end to the lower, horizontal element 13 of the frame 12 and at the other end to a pressure yoke 48 connected between the arms 24, 25. The lower clamping plate 17 is pivotably mounted on two arms 46, 47 mounted on the lower horizontal element 13 of the frame, and it can be rotated out of its position parallel to the upper clamping plate 18 by 45° about the axis 34 in the direction of arrow 22 and back. Two operating cylinders 41, 42 or 43, 44 are associated with each of the two clamping plates 17, 18 for pivoting them.

The pivoting of the mold support 11 about its axis 36, which is parallel to the axis 34, 35 of the clamping plates is accomplished by operating cylinders 37, 38. The mold support can be pivoted by about 60° out of its vertical position in the direction of arrow 45 (FIG. 1) and back to implement the venting of gases during the molding process.

Figure 3:
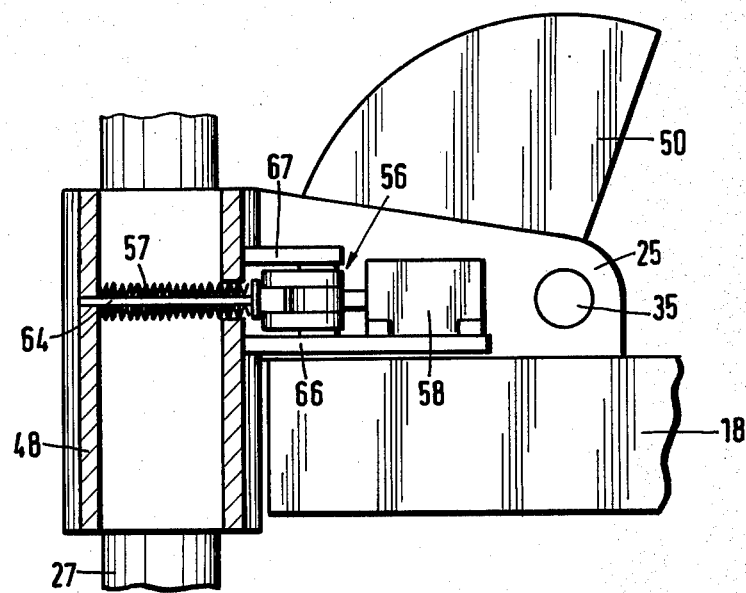
FIG. 3 shows an enlarged and detailed illustration, partially in section, of one of the mounts of the upper clamping plate and its special holding device.
Figure 4:
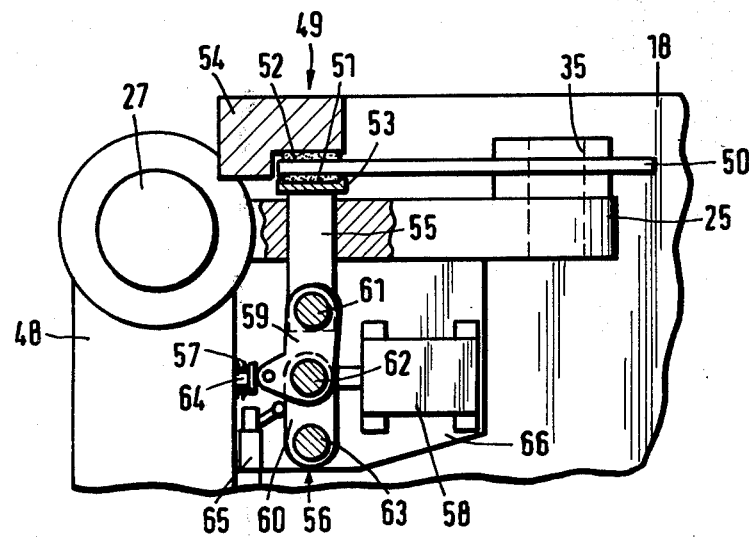
FIG. 4 shows a top view of FIG. 3, partially in section.

The special holding device shown in FIGS. 3 and 4 for the pivotable upper clamping plate 18 consists primarily of a disc brake 49 and a brake disc segment 50. The segment 50 is mounted above and to the clamping plate 18 and coaxially to the axis 35 thereof. The disc brake 49 has two friction linings 51, 52 which are mounted in pressure pads 53, 54. The pad 54 is attached to the arm 25, and the pad 53 is mounted on a pin 55 which is guided in a bore of the arm 25. The pin 55 is an extension of a lever system 56 arranged between two holding plates 66, 67 on one of whose sides pressure springs 57 in the form of spring discs are arranged on a pusher 64 and on whose other side and opposite the springs 57 an operating cylinder 58 is mounted. The lever system 56 consists of a two-armed element 59 and a one-armed element 60, which are connected with each other in a hinged fashion and with the pin 55 by pins 61, 62, 63.

The springs 57 with the pusher 64 and the operating cylinder 58 are fixed with respect to the pressure yoke 48 in such a manner that the springs 57 hold the lever system 56 in the extended or straight position shown when the cylinder 58 is not pressurized by oil. If the cylinder 58 is pressurized the lever system 56 is forced to pivot about center pin 62 and form an angle pointing to the left in FIG. 4, and the springs 57 are compressed. In its extended position the lever system presses the pad 53 and its friction lining 51 against the brake disc segment 50, and this in turn urges the friction lining 52 against the stationary pad 54. The brake disc segment 50 is thus clamped between the two pads by their friction linings. In the retracted position of the lever system 56 and pads 53, 54 and their friction linings 51, 52 are spaced from the brake disc segment 50. The distance of the spacing is quite small, however, preferably only about 0.2 mm. The pads 53, 54 may also have known elements (not shown) for resetting or adjusting the friction linings 51, 52 to compensate for wear. An electric sensor switch 65 is mounted next to the lever system 56, which in conjunction with further electrical elements indicates whether or not the disc brake 49 is engaged with the brake disc segment 50. A disengagement indication is, of course, a prerequisite for the pivoting of the clamping plate 18.

Similar special holding devices are also provided for the lower clamping plate 17, although they are not shown in the drawings in the interest of simplicity. They correspond, however, to the disc brake devices for the upper clamping plate 18, and are arranged on the lower arms 46, 47 and on the lower horizontal element 13 of the frame 12. The brake disc segment thereof is mounted coaxially to the axis 34 of the clamping plate 17.

The same special holding devices are also provided for the mold support 11, again not shown in the drawings. They are arranged in the vicinity of the axis 36 of the mold support 11, and correspond to the disc brake devices for the upper clamping plate 18.

A special holding device for preventing an undesirable lowering of the upper clamping plate 18, for example when said plate has been moved into its uppermost position for cleaning the elements 20, 21 of the mold 19, is also not shown in the drawings. This holding device largely corresponds in embodiment and arrangement to that disclosed for the upper clamping plate 18, however in place of a brake disc segment 50 brake rods are provided which are arranged on the pressure yoke 48 parallel to the guide columns 26, 27.

Of course it is advantageous if all of the above-mentioned special holding devices are incorporated in the apparatus. It is also possible, however, to equip only the clamping plates and/or the mold support therewith.

What is claimed is:

1. An apparatus for molding shaped articles from expandable plastics such as polyurethane, including a base support (10), a mold holder (11) mounted to the support for pivotal movement about a first axis (36), a pair of clamping plates (17, 18) mounted to the mold holder for pivotal movement about respective second and third axes (34, 35), said plates being disposed opposite each other and one above the other when said mold holder is in a vertical position, a pair of mating mold parts (20, 21) individually mounted to said clamping plates, means (28, 29) for moving one of said plates toward and away from the other plate, and a special holding device for locking one of the clamping plates or the mold holder to prevent any undesired movement thereof, characterized by:

the special holding device comprising a controllably energizable disc brake unit (49) cooperably mounted with respect to a brake disc (50).

2. Apparatus according to claim 1, wherein the disc brake unit is urged into a locking position by pressure springs (57) and is moved into a release position by a fluid operating cylinder (58).

3. Apparatus according to claim 2, wherein the disc brake unit includes an interconnected lever linkage (56) against which the pressure springs and operating cylinder act in opposition.

4. Apparatus according to claims 2 or 3, wherein the pressure springs comprise a serially stacked plurality of spring discs.

* * * * *